United States Patent [19] [11] 4,024,326
Hudgin [45] May 17, 1977

[54] PROCESS FOR PREPARING ETHYLENE-CARBON MONOXIDE COPOLYMERS USING A PEROXYDICARBONATE CATALYST

[75] Inventor: Donald E. Hudgin, Princeton Junction, N.J.

[73] Assignee: Atlantic Richfield Company, Los Angeles, Calif.

[22] Filed: Oct. 14, 1975

[21] Appl. No.: 622,194

Related U.S. Application Data

[63] Continuation-in-part of Ser. No. 501,526, Aug. 29, 1974, abandoned.

[52] U.S. Cl. .............................. 526/11.1; 526/230
[51] Int. Cl.² ................ C08G 67/02; C08F 210/02; C08G 2/00
[58] Field of Search .... 260/63 CQ, 94.9 R, 94.9 A; 526/11.1

[56] References Cited

UNITED STATES PATENTS

| | | | |
|---|---|---|---|
| 2,495,286 | 1/1950 | Brubaker | 260/63 CQ |
| 2,680,763 | 6/1954 | Brubaker | 260/63 CQ |

OTHER PUBLICATIONS

*Organic Peroxides,* vol. I, Swern Editor, John Wiley, Pub. 1971, pp. 81–87.
*Polymer Handbook* Editors J. Brandrup et al., Interscience Publ. N.Y., N.Y., pp. II–1, II–39, II–40.
*IPP Columbia Southern Technical Bulletin,* 1959, pp. 1–5, Table 12–13.

*Primary Examiner*—Joseph L. Schofer
*Assistant Examiner*—Herbert J. Lilling
*Attorney, Agent, or Firm*—Coleman R. Reap

[57] ABSTRACT

High melting ethylene-carbon monoxide copolymers are prepared by copolymerizing ethylene and carbon monoxide at relatively low temperatures and pressures using a peroxy dicarbonate catalyst. The preferred catalysts are dicyclohexylperoxydicarbonate and dicetylperoxydicarbonate.

11 Claims, No Drawings

PROCESS FOR PREPARING ETHYLENE-CARBON MONOXIDE COPOLYMERS USING A PEROXYDICARBONATE CATALYST

This is a continuation-in-part of application Ser. No. 501,526, filed Aug. 29, 1974, now abandoned.

BACKGROUND OF THE INVENTION

This invention relates to ethylene-carbon monoxide and more particularly to an improved process for preparing ethylene-carbon monoxide copolymers.

Ethylene-carbon monoxide copolymers have been known for several years and have been of considerable interest because of their potential value as engineering plastics. Ethylene-carbon monoxide copolymers having high carbon monoxide contents, particularly 40% or more, are especially interesting because they possess high melting points and other superior properties which would make them very suitable for many engineering applications. Ethylene-carbon monoxide copolymers are also of interest since carbon monoxide is a very inexpensive by-product obtained in the manufacture of steel and is, therefore, unlike most other monomeric materials used in the production of synthetic polymers, not derived from petroleum. In spite of the great potential of these copolymers, their development has been slow and they have not yet gained commercial acceptance. The principal reason for this is that no commercially feasible process for their production has been developed.

The preparation of high molecular weight ethylene carbon-monoxide copolymers has been accomplished by gamma radiation initiation but this method requires the use of expensive equipment, high pressures, and inordinately long reaction times. Furthermore, polymer produced by this method may be partially cross-linked and, thus, very difficult to process. Since chemical catalysis offers more advantages and fewer hazards than radiation initiation, considerable effort has been made to develop useful chemical catalytic process for the production of ethylene-carbon monoxide copolymers.

U.S. Pat. No. 2,495,286, issued to Brubaker, discloses the use of organic peroxides as catalysts for the preparation of ethylene-carbon monoxide copolymers. As shown in this patent and other patents such as the Nozaki patents, U.S. Pat. No. 3,689,460 and 3,694,412, very high pressures, on the order of 500 atmospheres or more and high temperatures are required for the preparation of normally solid polymers when using peroxide catalysts. Furthermore, the total polymer yield and carbon monoxide content are quite low when the catalysts disclosed by Brubaker are used in the preparation of ethylene-carbon monoxide copolymers. This is unfortunate since it has been determined that ethylene-carbon monoxide copolymers having ethylene:carbon monoxide ratios close to unity have the most desirable physical properties and a higher degree of crystallinity than those containing lower carbon monoxide contents. It would be highly desirable to develop a process for preparing high melting ethylene-carbon monoxide copolymers in high yield and with high carbon monoxide contents without the necessity of resorting to the use of high pressures and temperatures.

SUMMARY OF THE INVENTION

An improved process for preparng ethylene-carbon monoxide copolymers has now been discovered by which copolymers having high melting points and high carbon monoxide contents can be produced in good yields at relatively low temperatures and moderate pressures.

Accordingly, it is an object of the invention to present an improved process for preparing ethylene-carbon monoxide copolymers. It is another object of the invention to present a process for preparing ethylene-carbon monoxide having increased carbon monoxide content. It is another object of the invention to present a process for preparing high melting ethylene-carbon monoxide copolymers without resorting to the use of high temperatures or pressures. It is another object of the invention to present a process for preparing ethylene-carbon monoxide in improved yields. These and other objects will become more readily apparent from the following description and examples.

The above objects are accomplished by copolymerizing ethylene and carbon monoxide in the presence of a peroxy dicarbonate catalyst. The catalyst may be used at any concentration which is effective to produce the desired results and the desired catalyst concentration usually varies from about 0.005 to 5.0% and preferably from about 0.1 to 2.0%, based on the total weight of monomeric components present in the reaction mixture. The reaction may be carried out with or without a solvent or diluent for the monomers. In a preferred embodiment the reaction is conducted in the presence of dicyclohexylperoxydicarbonate or dicetylperoxydicarbonate as catalyst.

DESCRIPTION OF THE INVENTION

The reaction between the ethylene and the carbon monoxide may be carried out under batch or continuous conditions but for convenience the invention will be described as it applies to a batch type process. The reaction is preferably carried out in a reaction vessel which can withstand high pressures and the corrosive effects of carbon monoxide. Stainless steel or glass lined reactors are generally considered to be suitable materials for the inside surfaces of the reactor.

In a typical operation for preparing ethylene-carbon monoxide copolymer a solvent, if one is used, is added to the reaction vessel and an inert gas, such as nitrogen, is passed through the reactor to remove oxygen. The peroxydicarbonate catalyst and any desired polymerization modifiers or other additives are next introduced into the reaction vessel. The vessel is then closed and pressured with an ethylene-carbon monoxide gas mixture. Heat is then applied to the reaction vessel to initiate the reaction and the vessel contents are heated to and maintained at the desired temperature until the reaction is completed. The pressure is maintained by introducing additional ethylene and carbon monoxide from time to time as they are used up in the reaction. When the polymerization is completed, the reactor contents are cooled and the solvent is separated from the polymer by any desired method, for example, by distillation, and the polymeric product is recovered.

The ratio of ethylene to carbon monoxide in the reaction vessel may vary depending upon the type of product being prepared. When preparing copolymers with substantial carbon monoxide contents, the weight ratio of ethylene to carbon monoxide is desirably maintained in the range of about 4:1 to 1:4. The gas charge may contain inert gases such as nitrogen which serves as a gaseous diluent or it may contain only ethylene and carbon monoxide. In the latter case the gas charge preferably contains about 80 to 20% ethylene and about 20 to 80% carbon monoxide. The ratio of ethylene and carbon monoxide may be varied as the polymerization reaction proceeds, if desired. In this way the constitution of the polymer chains can be varied.

Other ethylenically unsaturated monomers which polymerize with ethylene and/or carbon monoxide can be included in the reaction mixture formulation to modify the properties of the polymeric product. Includable as suitable monomers are alkenes containing 3 to 8 carbon atoms such as propylene, isobutylene, hexene, etc.; cycloaliphatic compounds such as cyclohexene, etc.; aromatic substituted alkenes such as styrene, etc.; acrylic compounds such as acrylic or methacrylic acid, acrylonitrile, etc.; vinyl esters such as vinyl acetate, etc.; vinyl halides such as vinyl chloride, vinylidene chloride, etc.; dienes such as butadiene, isoprene, 2-chloro-butadiene, etc. The amount of other polymerizable monomer or monomers used in the ethylene-carbon monoxide reaction mixture will be determined by the properties desired in the product. In general, if other polymerizable monomeric compounds are included in the formulation, it is preferred to limit the quantity of such other compounds to minor amounts such as up to about 45% based on the total weight of monomeric components present in the reaction mixture.

The catalysts which have been found to produce the unexpected results of the present invention are the peroxydicarbonates. Typical peroxydicarbonate compounds are di(n-propyl)peroxydicarbonate, di(2-ethylhexyl)-peroxydicarbonate, dicyclohexylperoxydicarbonate, dicetylperoxydicarbonate, etc. These compounds can be prepared by well known procedures and are established commercial products. The preferred peroxy dicarbonates are di(2-ethylhexyl)peroxydicarbonate, dicyclohexylperoxydicarbonate, and dicetylperoxydicarbonate because these compounds do not require extremely cold storage conditions. The latter two compounds, dicyclohexylperoxydicarbonate and dicetylperoxydicarbonate, are particularly preferred because they can be safely stored at temperatures above the freezing point of water.

The catalyst concentration may vary depending upon the properties desired in the product and the temperature at which the reaction is to be carried out. In general, the catalyst is effective at concentrations as low as about 0.005% based on the total weight of polymerizable monomer present and amounts up to about 5% or more will produce the desired result. It is preferred to use the catalyst at a concentration of about 0.1 to 2%, based on the total weight of polymerizable monomer present in the reaction mixture.

A cocatalyst may be used, if desired, in conjunction with the peroxydicarbonate catalyst. The useful concentration of the cocatalyst can vary from about 0.01 to 5.0%, based on the total weight of polymerizable monomers present in the reaction mixture. Suitable cocatalysts include other free radical compounds such as organic peroxides, e.g., t-butylperoxypivalate, benzoyl peroxide, lauroyl peroxide, etc., and azo compounds such as 2,2'-azobis(isobutyronitrile), etc.

Solid ethylene-carbon monoxide copolymers which are useful as engineering plastics may be prepared at pressures as low as about 300 psig. This is surprising since, as pointed out above, pressures of at least 500 atmospheres are required when using other peroxide catalysts. In general, it has been observed that higher molecular weight polymers are obtained by carrying out the reaction at higher pressures and, accordingly, pressures as high as 3000 atmospheres can be used if desired. However, high molcular weight copolymers are obtained using the disclosed catalysts at moderate pressures and it is not generally necessary nor desirable that the reaction pressure exceed about 2000 psig. In the preferred embodiment the pressure is maintained in the range of about 500 to 1500 psig.

The temperature at which the reaction is carried out may vary depending upon the other reaction conditions and the type of product desired. The use of peroxydicarbonates permits the use of lower temperatures than is desirable when using other less active catalysts. The temperature is usually maintained between about 20° and 100° C. and preferably between about 20° and 70° C. during the polymerization reaction since more gel-free higher molecular weight polymers are obtained at lower temperatures.

The reaction may be carried out either in the presence of or the absence of a solvent or diluent for the reactants. In general, it is preferable to use a solvent or diluent to prevent local heat buildup and to reduce the viscosity of the polymerizing mass. Solvents or diluents used are desirably volatile so that they can more easily removed from the polymeric product. Suitable solvents and diluents include aliphatic, cycloaliphati, and aromatic hydrocarbons such as isooctane, cyclohexane, benzene, etc.; ethers such as dioxane, propylene oxide, etc.; and other organic or inorganic liquids which are free of substituents or impurities which interfere with the desired reaction between the ethylene and the carbon monoxide. Two or more solvents and/or diluents can be used in combination in the process of the invention.

Other additives such as plasticizers antioxidants, molecular weight regulators, coloring agents, fillers, lubricants, etc. may be incorporated into the formulation prior to, during or subsequent to the polymerization reaction. It is usually more efficient and economical to incorporate fillers and other inert materials into the polymerized product in a post polymerization blending operation.

The following examples illustrate preferred embodiments of the invention. Unless otherwise indicated, parts and percentages are on a weight basis.

EXAMPLE I

A 1 liter Parr Instrument Company reactor (Model 4521) is charged with 500 ml. propylene oxide and 1 gram of dicyclohexylperoxydicarbonate. The reactor is sealed and purged with prepurified nitrogen. The reactor is then pressurized with a purified 50/50 carbon monoxide/ethylene mixture of 1200 psig. With stirring the temperature is raised to 23° C. For 21 hours the temperature is maintained between 23° and 33° C. while the pressure was maintained between 885 and 1235 psig by periodically repressurizing with the gas mixture. The reactor is allowed to cool to room temperature and is then depressurized. The propylene oxide is evaporated, leaving 31.3 grams of copolymer, having a melting range 210°–220° C. and an oxygen content of 28.13%, which calculates to 49.23% carbon monoxide in the copolymer. A disc, prepared by compression molding of the copolymer has a Shore D hardness of 73.

EXAMPLE II

A 1 liter Parr Instrument reactor (Model 4521) is charged with 500 ml. of propylene oxide, 1 gm. of dicyclohexylperoxycarbonate and 3 gm. $KH_2PO_4$. The reactor is sealed and purged with nitrogen gas for 40 minutes. It is the pressured to 1005 psig. with a 50/50 mixture of ethylene and carbon monoxide. The contents of the reactor are maintained at a temperature between 19° and 37° C. for 23 hrs. and 20 mins. during which time the pressure is maintained between 660 and 1015 psig. by periodically repressuring the reactor with ethylene-carbon monoxide mixture. The reactor contents are then cooled to room temperature, the reactor depressurized, and the contents removed. The product is washed with normal hexane and dried. It is snow white and has a melting range of 200°–205°. The product is tested according to the thermal stability test described in Example I. The polymer after heating is light yellow in color.

EXAMPLE III

The procedure of Example I is repeated except that 1 gram of dicetylperoxydicarbonate is substituted for the dicyclohexylperoxydicarbonate. An ethylene-carbon monoxide copolymer containing a high percentage of carbon monoxide and having good Shore D hardness will be obtained.

Examples I to III demonstrate that useful ethylene-carbon monoxide copolymers can be prepared at low to moderate pressures and low temperatures by carrying out the polymerization in the presence of peroxydicarbonate compounds as catalyst.

Although the invention has been described with particular reference to specific examples, the scope of the invention is not limited thereto but is defined by the breadth of the appended claims.

I claim:

1. An improved process for preparing ethylene-carbon monoxide copolymers comprising reacting a mixture of ethylene and carbon monoxide in the presence of a peroxydicarbonate catalyst.

2. The process of claim 1 wherein the peroxydicarbonate is present in an amount effective to produce the desired result up to about 5%, based on the total weight of monomeric components.

3. The process of claim 1 wherein the reaction is carried out at a pressure of about 300 to 2000 psig.

4. The process of claim 1 wherein the reaction is carried out at a pressure of about 500 to 1500 psig.

5. The process of claim 1 wherein the reaction is carried out in the presence of a solvent.

6. The process of claim 1 wherein at least one additional monomer is added to the reaction mixture.

7. The process of claim 1 wherein the reaction is carried out at a temperature of about 20° to 100° C.

8. The process of claim 1 wherein the ratio of ethylene to carbon monoxide in the reaction mixture is about 1:4 to 4:1.

9. The process of claim 1 wherein the peroxydicarbonate is a member of the group consisting of di(2-ethylhexyl)peroxydicarbonate, dicyclohexylperoxydicarbonate, and dicetylperoxydicarbonate.

10. The process of claim 9 wherein said peroxydicarbonate is dicyclohexylperoxydicarbonate.

11. The process of claim 9 wherein said peroxydicarbonate is dicetylperoxydicarbonate.

* * * * *